(Model.)
E. C. EATON.
SULKY PLOW.
No. 270,033. Patented Jan. 2, 1883.
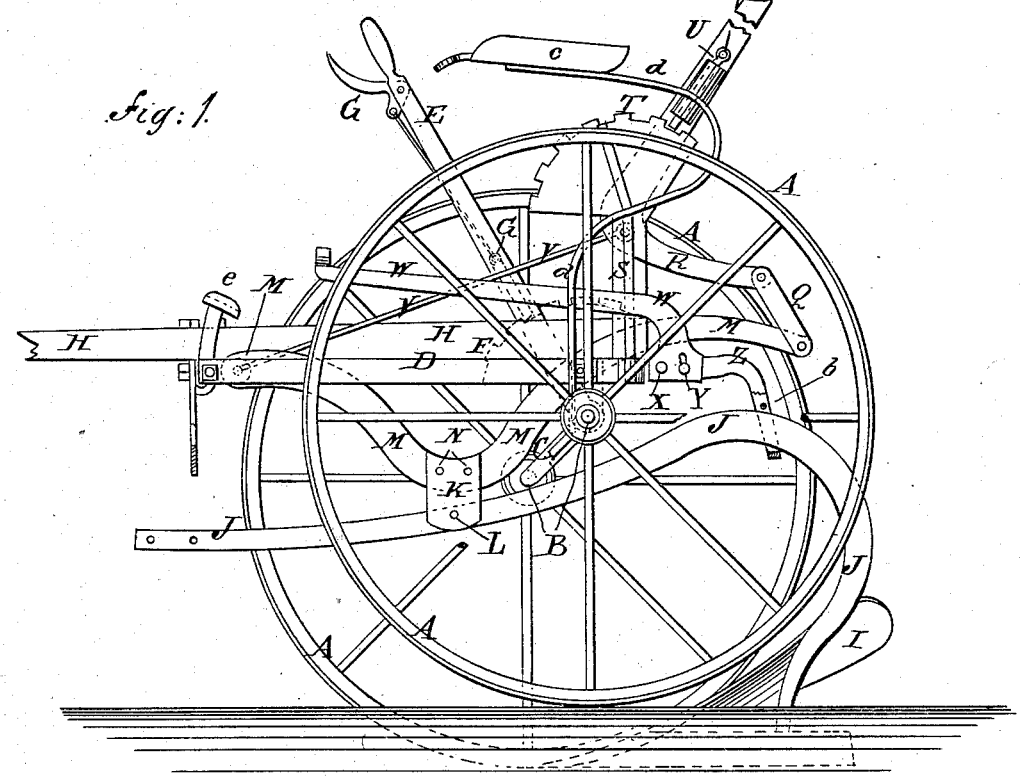
Fig: 1.
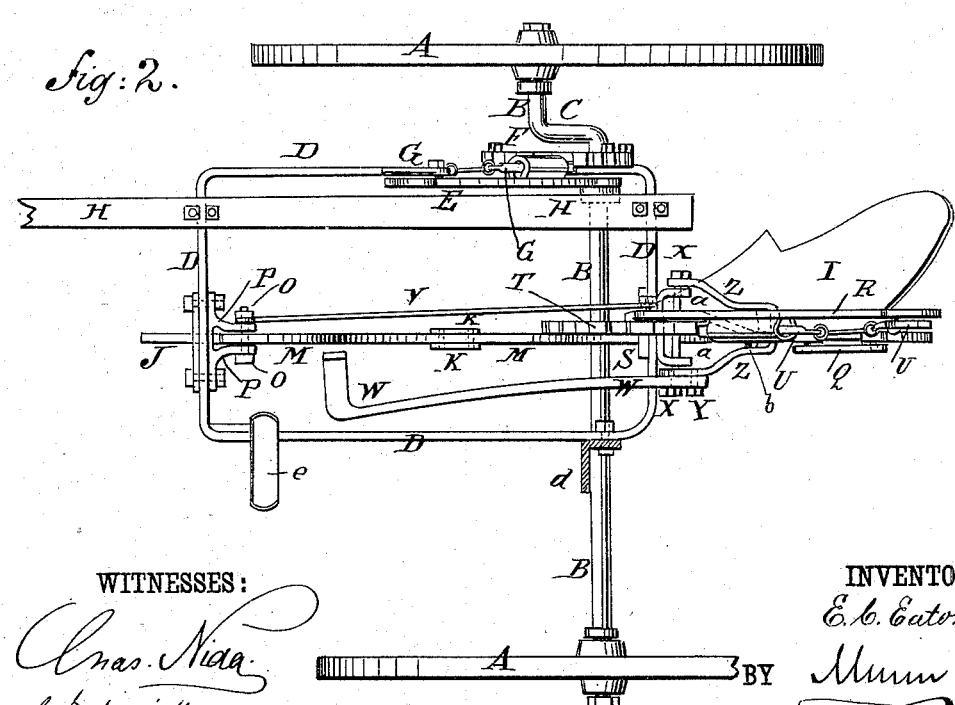
Fig: 2.
WITNESSES:
Chas. Nida
C. Sedgwick
INVENTOR:
E. C. Eaton
BY Munn & Co.
ATTORNEYS.

UNITED STATES PATENT OFFICE.

ENOCH C. EATON, OF PINCKNEYVILLE, ILLINOIS.

SULKY-PLOW.

SPECIFICATION forming part of Letters Patent No. 270,033, dated January 2, 1883.

Application filed September 30, 1882. (Model.)

*To all whom it may concern:*

Be it known that I, ENOCH CALVIN EATON, of Pinckneyville, in the county of Perry and State of Illinois, have invented a new and useful Improvement in Sulky-Plows, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a plan view of the same, the seat being removed and the seat-standard shown in section.

The object of this invention is to facilitate the adjusting, controlling, and holding of sulky-plows.

A represents the wheels, and B the axle, of my improvement. The axle B has an offset or crank, C, formed in it near the furrow-wheel, and works in bearings attached to the frame D, so that by turning the axle B the frame can be kept level when the said furrow-wheel is running upon the unplowed land, or in a deep or a shallow furrow.

To the axle B, at the inner side of the right-hand side bar of the frame D, is rigidly secured, by a set-screw or other suitable means, the lower end of a lever, E, by means of which the said axle can be readily turned into any desired position. The lever E moves along an arched catch-bar, F, attached to the side bar of the frame D, and is provided with an ordinary lever-operated spring-pawl, G, to engage with the notches of the said catch-bar F and hold the lever E, and with it the axle B, in any position into which they may be adjusted.

H is the tongue, which is adjustably secured to the front and rear cross-bars of the frame D by U-bolts or other suitable means.

I is the plow, the forward part of the beam J of which passes between two plates, K, and is hinged to the said plates by a bolt, L. The lower ends of the plates K extend to or below the lower side of the plow-beam J, so as to prevent the plow from turning laterally, while allowing it to play freely in a vertical direction upon the hinging-bolt L, to cause the plow to run deeper or shallower in the ground, and to allow the said plow to be readily raised from and lowered to the ground.

The upper ends of the two plates K are secured to the opposite sides of the downwardly-bent middle part of the bar M by two bolts, N, as shown in Fig. 1, so that the said plates will be held firm and steady. The part of the bar M in front of the plates K is curved upward and forward, and its forward end is hinged by a bolt, O, to and between two lugs, P, which are securely bolted to the front cross-bar of the frame D, so that the rear part of the said bar M will have a free vertical play. The part of the bar M in the rear of the plates K is bent upward, rearward, and downward, and its rear end is connected by a link, Q, with the lower end of the elbow-lever R, which is pivoted at its angle to the slotted standard S, attached at its lower end to the rear cross-bar of the frame D, and which serves as a guide to the rear part of the bar M as it moves up and down.

To the upper part of one side of the slotted standard S is attached, or upon it is formed, an arched catch-bar, T, with the notches of which engages the lever-operated spring-pawl U, to hold the lever R, and with it the bar M and plow I J, in any position into which they may be adjusted. The slotted standard S is strengthened against the rearward strain, when raising the plow out of the ground, by a brace-rod, V, the rear end of which is secured to the said standards S by the pivoted bolt of the bent lever R, and its forward end is connected with the forward cross-bar of the frame D by the bolt that hinges the forward end of the curved bar M to the said frame.

W is an adjustable foot-lever, the rear end of which is bent downward, and is widened to receive the bolts X Y, that connect it with the arm of the stirrup Z. The forward bolt, X, passes through the lever W, through both arms of the stirrup Z, and through lugs a, secured to the rear cross-bar of the frame D by bolts, so that the lever W and stirrup Z will be rigidly connected together, and will be hinged to the rear cross-bar of the frame D. The rear end of the lever W is slotted to receive the bolt Y, so that the forward end of the said lever can be adjusted higher or lower, as the convenience of the driver may require. The plow-beam J passes through the stirrup Z, and is kept from rising in the said stirrup by a pin or bolt, $b$, passed through the arms of the said stirrup above the said beam.

$c$ is the driver's seat, the standard $d$ of which is attached to the inner side bar of the frame D.

To the inner forward corner of the frame D is attached a rest, $e$, for the driver's feet.

With this construction the plow will be held steady and prevented from tipping toward either side, and can be raised from and lowered to the ground by operating the lever R. With this construction, also, the driver can raise and lower the plow while at work by operating the lever W with his foot, and can also use the said lever to assist in raising the plow from the ground. With this construction, also, should the plow incline to run out of the ground, it can be held down by pulling the foot-lever W upward slightly.

Having thus described my invention, I claim as new and desire to secure by Letters Patent—

1. The combination, with the curved bar M, pivoted to the front bar of frame D and connected with the plow-beam in front of the axle and extended back over the axle, of the link Q, the elbow-lever R, and the slotted standard S, whereby said bar may be guided and raised, as described.

2. In a sulky-plow, the combination, with the frame D and the plow-beam J, of the hinged stirrup Z and the adjustable foot-lever W, substantially as herein shown and described.

ENOCH CALVIN EATON.

Witnesses:
E. M. HAWKINS,
H. S. BROWN.